(No Model.) 2 Sheets—Sheet 1.

P. DIEHL.
ELECTRIC MOTOR.

No. 356,576. Patented Jan. 25, 1887.

Witnesses:
E. D. Smith
H. N. Low

Inventor:
Philip Diehl (No Model.) 2 Sheets—Sheet 2.
P. DIEHL.
ELECTRIC MOTOR.
No. 356,576. Patented Jan. 25, 1887.
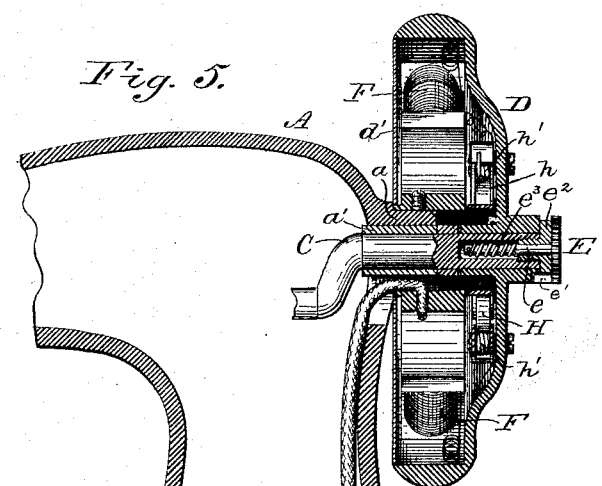
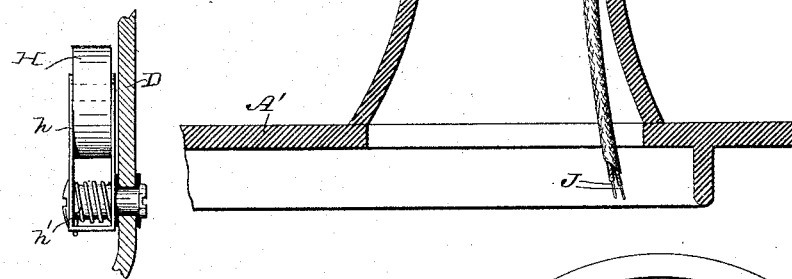
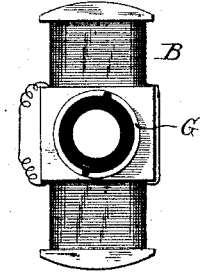
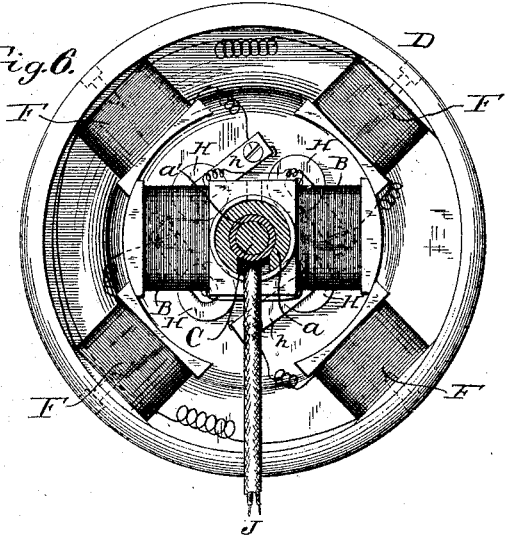
Witnesses:
E. D. Smith
H. N. Low
Inventor:
Philip Diehl,
by Henry Calver
atty

UNITED STATES PATENT OFFICE.

PHILIP DIEHL, OF ELIZABETH, NEW JERSEY.

ELECTRIC MOTOR.

SPECIFICATION forming part of Letters Patent No. 356,576, dated January 25, 1887.

Application filed July 13, 1886. Serial No. 207,866. (No model.)

*To all whom it may concern:*

Be it known that I, PHILIP DIEHL, a citizen of the United States, residing at Elizabeth, in the county of Union and State of New Jersey, have invented certain new and useful Improvements in Electric Motors, of which the following is a specification, reference being had therein to the accompanying drawings.

The object of my invention is to provide a simple and effective electric motor adapted to drive sewing and other similar light machines without the use of belts, the motor being constructed so that it may be contained within the driving or fly wheel of the machine, so that the latter, in addition to its usual function, will serve as a housing for the motor.

In carrying my invention into effect, I secure to the hub, or other stationary part which serves as a bearing for the shaft to be driven, a field-magnet. The fly-wheel is made somewhat larger than usual, and has, preferably, a clutch or "stop-motion" connection with the shaft, so that it may be connected with the latter or turn loosely thereon, as is common in sewing-machines, the wheel being disconnected from the shaft when winding bobbins. The wheel is recessed or made hollow, and is provided interiorly with electro-magnets forming armatures which rotate in juxtaposition to the poles of the stationary field-magnet which is housed within the wheel. A commutator and brushes of any ordinary or suitable construction are employed to change the polarity of the field-magnets in the usual manner. In the electric circuit I prefer to provide contact blocks or buttons, against one of which bears a spring arm or switch, which may be forced away from its block or button by a hand-lever to open the circuit, and thus stop the machine.

Figure 2:
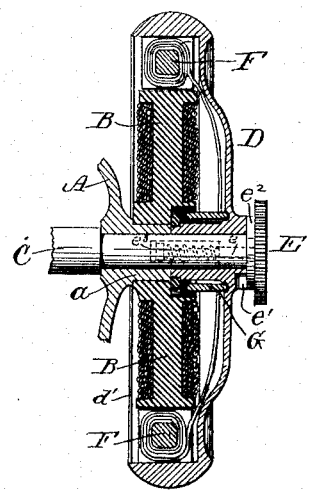
Figure 1:
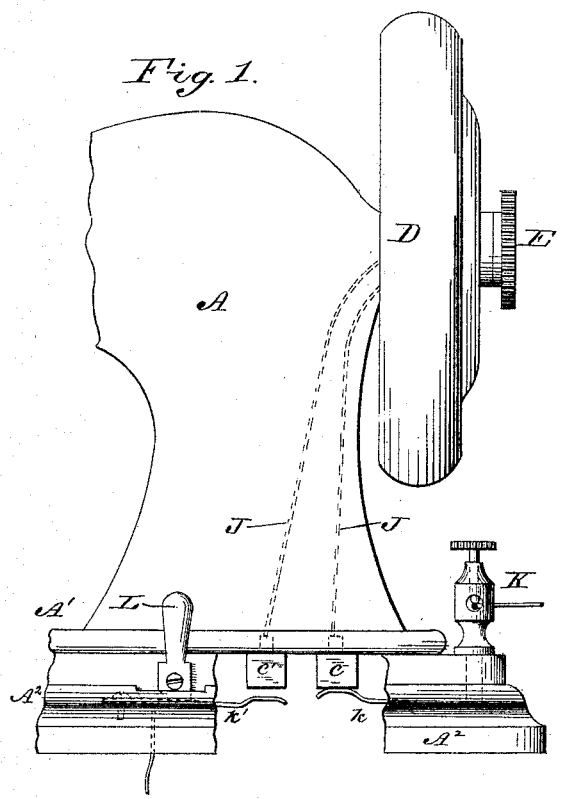
Figure 3:
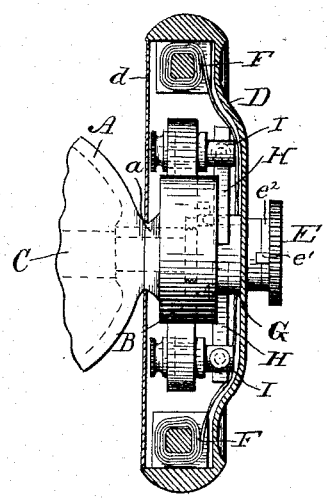
Figure 4:
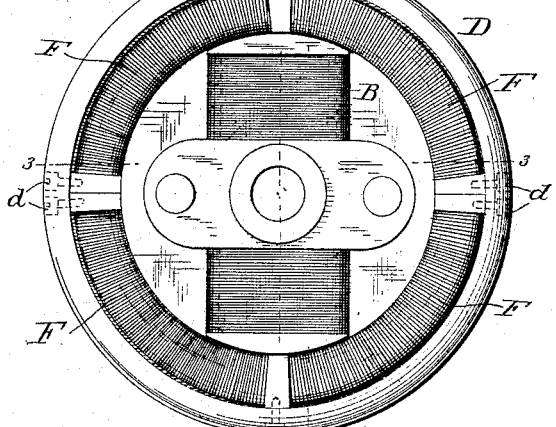

In the drawings, Figure 1 is a partial elevation of a sewing-machine with my invention applied thereto. Fig. 2 is a sectional view of my motor in its preferred form on line 2 2, Fig. 4. Fig. 3 is an elevation, partly in section, on line 3 3, Fig. 4, of the same. Fig. 4 is an inside view of the wheel, showing also the field-magnet. Fig. 5 is a partial view of a sewing-machine provided with a modified form of my invention. Fig. 6 is an inside view of the wheel and field-magnet shown in Fig. 5. Fig. 7 is a detail view of the field-magnet and commutator used with the modified form of my invention, and Fig. 8 is a detail view of one of the brushes used therewith.

In the drawings, A denotes the arm of a sewing-machine, having a hub, $a$, to which is secured the stationary field-magnet B. The driving-shaft C has its rear bearing in the hub $a$ or in a bushing, $a'$, Figs. 5 and 6, secured therein, said shaft extending outward through the said hub.

D is the driving fly-wheel, preferably mounted loosely on the projecting end of the shaft C, and is connected therewith by means of a clutch or stop-motion device, consisting, in the present instance, of the milled disk E, having a pin, $e$, and a lug, $e'$, the latter in connecting the fly-wheel with the shaft C extending through an opening in one side of the head of a nut, $e^2$, screwed into the end of the said shaft, and entering a notch or recess in the hub of the fly-wheel. A spiral spring, $e^3$, surrounding the pin $e$ normally holds the lug $e'$ in the notch in the hub of the fly-wheel, so as to connect the latter with the shaft; but the said wheel and shaft may be disconnected by pulling the disk E against the stress of the spring $e^3$ until the inner end of the lug is outside of the head of the nut $e^2$, when the said disk may be partially rotated to bring the lug $e'$ out of register with the opening in the said head, so that the spring cannot force the lug back into the notch in the hub of the fly-wheel, and thus the latter will be free to turn loosely on the shaft to enable the operator to wind bobbins without running the machine.

The fly-wheel D is made hollow or recessed interiorly, so as to inclose the field-magnet B and to receive the electro-magnet armature F, attached to the inside of said wheel, and electrically connected together in pairs when made in the form shown in Fig. 6. I prefer, however, to use armature-sections wound and coupled as in the well-known "Gramme" armature, as shown in Figs. 2, 3, and 4. With this construction the armature is held in place by set-screws $d$, tapped through the rim of the wheel D, the points of said screws entering holes in the blocks $f$, forming part of the armature-sections. By means of this construction the armature-sections may be fitted loosely to their positions, and afterward adjusted with the greatest nicety to bring the central relative to the poles of the field magnet.

The commutator G consists of as many sections as there are pairs or sections of the armature, and the brushes H, running in contact with the commutator, may be of any ordinary or suitable construction.

In the form of my invention shown in Figs. 2, 3, and 4 the commutator is secured to the hub of the fly-wheel, and the brushes are supported by stationary holders I, insulatingly attached to the frame of the field-magnet B, while in the form of my invention shown in Figs. 1 and 2 the commutator is attached to the hub of the field-magnet, and the brushes consist of rollers held by arms $h$, pivotally attached to but insulated from the fly-wheel D, the said rollers being held in contact with the commutator by springs $h'$, coiled around the pivot-screws of the arms $h$.

The conductors or terminals J are concealed in the arm of the machine, and are preferably connected with contact-buttons $c$ and $c'$, attached to the machine bed-plate A', and the latter may be hinged to a wooden base, $A^2$, in the manner in which it is common to hinge sewing-machines to their tables. The base $A^2$ may be attached to the sewing-machine table in any suitable manner. The contact-button $c$ is connected by a presser spring or arm, $k$, with a binding-post, K, and a similar spring, $k'$, to which is attached a suitable conductor, normally presses against the button $c'$. When, however, it is desired to open the circuit to stop the machine, the spring $k'$ may be forced away from its contact-button by means of a hand-lever, L, Fig. 1, pivoted to the wooden base $A^2$, and preferably formed with two straight faces, so that it will be held in either of two positions by the spring $k'$, as will be readily understood. The spring $k'$ thus forms a switch to open and close the circuit.

To protect the different parts of the motor from dust, and also to prevent them from being interfered with by the operator or others, I prefer to provide the wheel D on its inside with an inclosing-plate, $d'$, which, with the other parts of the wheel, forms a complete housing for the motor, so that all parts thereof are concealed from view and fully protected; and as the field-magnet conductors or terminals are housed within the arm of the machine, all of the parts of the motor above the work-plate are entirely out of the operator's way.

From the foregoing it will be apparent that the machine may be driven without the use of belts, and that the motor and machine may be started and stopped simply by the movement of a hand-lever to operate the spring-switch to open or close the circuit.

If desired, resistance-coils can be placed beneath the table of the machine and controlled by a handle or hand-lever, so that a dynamo-current may be used without inconvenience or without varying its strength.

I do not wish to be understood as confining my invention to the precise constructions herein shown and described, as it will be obvious that the details of my invention may be varied considerably without departing from the essential features thereof. It will also be apparent that my motor is adapted for use in connection with any other light machines as well as with sewing-machines.

Having thus described my invention, I claim and desire to secure by Letters Patent—

1. The combination, with a driving or fly wheel provided on its inside with an electro-magnet armature, of brushes, a commutator, and a stationary field-magnet, also within said wheel, and suitable electrical connections, whereby the said wheel and the shaft which it is to operate may be driven without the use of belts, substantially as set forth.

2. The combination, with a driving or fly wheel having within it a commutator, brushes, and a stationary field-magnet, of a shaft on which the said wheel is loosely mounted, and a clutch or stop-motion device for connecting and disconnecting said wheel and shaft at pleasure, substantially as set forth.

3. The combination, with a hollow driving or fly wheel for sewing-machines, having an armature attached to its inside, of a commutator, brushes, and a stationary field-magnet, all housed within said wheel, and thus protected from dust and disturbance by the operator or others, substantially as set forth.

4. The combination, with the arm of a sewing-machine, provided at its rear end with a hub, as $a$, of a field-magnet attached to said hub, a shaft extending through the latter, a hollow fly or driving wheel mounted on said shaft, an armature attached to the inside of said wheel, brushes, a commutator, and electrical connections, substantially as set forth.

5. The combination, with the arm of a sewing-machine, provided at its rear end with a hub, of a field-magnet attached to said hub, a shaft extending through the latter, a hollow fly or driving wheel loosely mounted on said shaft, a clutch or stop-motion device for connecting and disconnecting said shaft and wheel, an armature attached to the inside of said wheel, brushes, a commutator, and electrical connections, substantially as set forth.

6. The combination, with the arm of a sewing-machine, the driving-shaft, the fly-wheel mounted on the latter, the field-magnet attached to the said arm, and the armature, brushes, and a commutator within said wheel, of electric conductors or terminals housed within the said arm, substantially as set forth.

7. The combination, with the sewing-machine arm and bed-plate, the driving or fly wheel, and devices constituting an electric motor inclosed within the latter, of electric conductors or terminals within the said arm, contact blocks or buttons for the said terminals, an arm or switch adapted to press against one of said blocks or buttons, and a device, as a hand-lever, for operating said arm or switch to open or close the circuit, substantially as set forth.

8. The combination, with the driving or fly wheel, of the armature-sections within the same, the field-magnet, also within said wheel, and the adjusting set-screws, by which the said sections may be centralized, substantially as set forth.

9. The combination, with a fly or driving wheel and a shaft on which the same is mounted, of suitable devices constituting a complete electric motor, all adapted to be contained within said wheel, substantially as set forth.

In testimony whereof I affix my signature in presence of two witnesses.

PHILIP DIEHL.

Witnesses:
JAMES G. GREENE,
JAS. T. SHAW.